No. 724,493. PATENTED APR. 7, 1903.
G. J. PEACOCK.
OILER.
APPLICATION FILED JAN. 20, 1902.
NO MODEL.
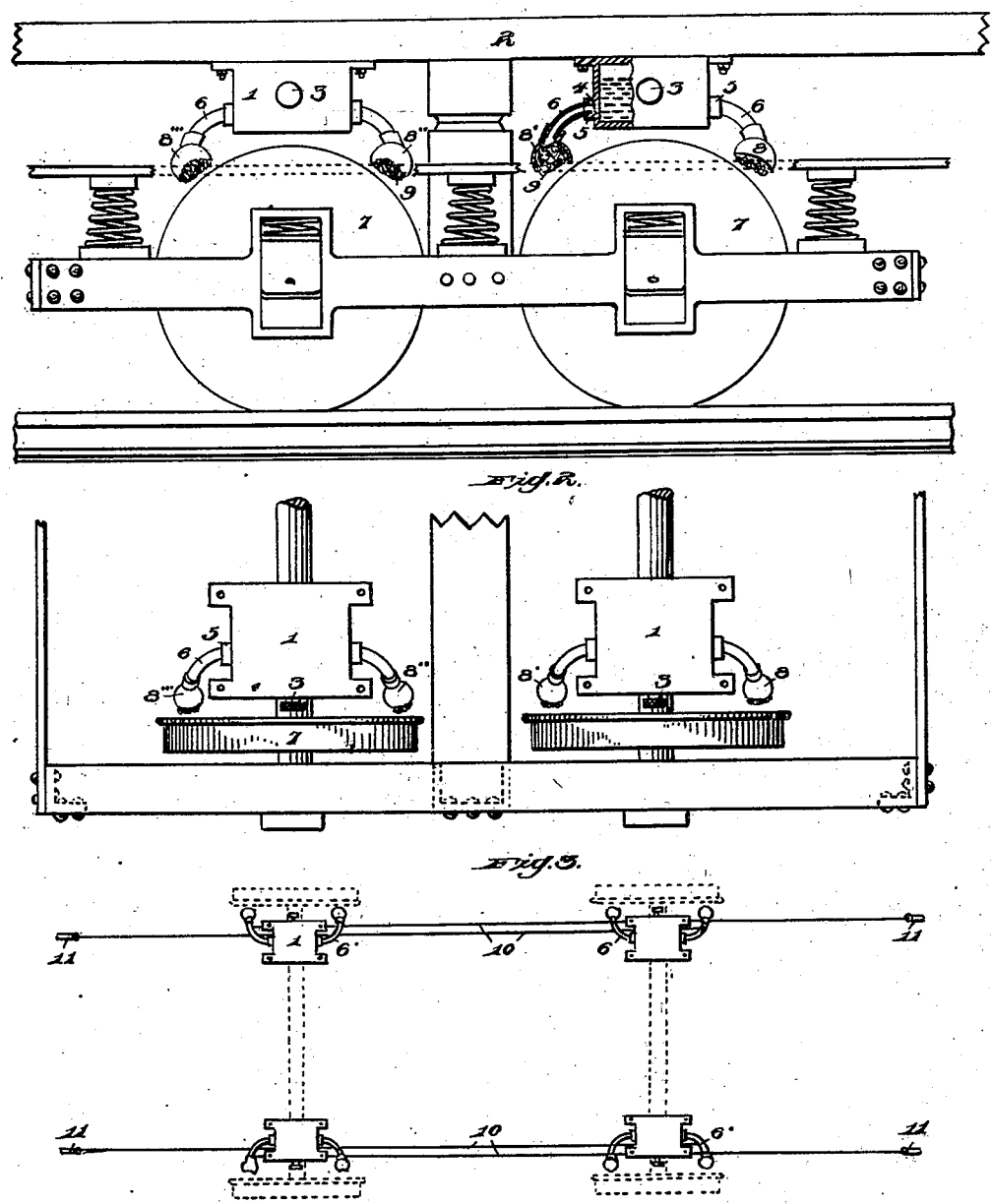

UNITED STATES PATENT OFFICE.

GEORGE JAMES PEACOCK, OF PITTSBURG, PENNSYLVANIA, ASSIGNOR OF ONE-FOURTH TO HENRY V. POTTER, OF PITTSBURG, PENNSYLVANIA.

OILER.

SPECIFICATION forming part of Letters Patent No. 724,493, dated April 7, 1903.

Application filed January 20, 1902. Serial No. 90,520. (No model.)

*To all whom it may concern:*

Be it known that I, GEORGE JAMES PEACOCK, a citizen of the United States, residing at Pittsburg, in the county of Allegheny and State of Pennsylvania, have invented a new and useful Improvement in Oilers, of which improvement the following is a specification.

This invention relates to certain new and useful improvements in oilers, and relates particularly to an automatic oiler which is adapted to oil the flange of street-car wheels at the time of rounding curves.

In the operation of street-cars it is well known that a very large percentage of the wear upon the wheels is caused by the action of the wheels against the curves in the track when turning from one street into another street running at right angles thereto, and it is necessary to employ men to keep the rails of the track well greased or oiled at the curves to obviate the wear to as great an extent as possible to prevent the tightening of the wheels against the curved rails. My invention aims to automatically oil the flanges of the wheels as the car rounds the curve, and in use upon trucks known in the trade as "pivoted" trucks the device is automatically brought into engagement with the flanges of the wheel, while in use with trucks known as "rigid" trucks—that is, trucks that are not pivoted to the body of the car, but are rigid with the body of the car—the oil is applied by the motorman operating the lever having action with the oil-cups to bring the latter into engagement with the wheels.

In the accompanying drawings I have shown a practical illustration of my invention in connection with both a pivotal and rigid form of truck, and in the drawings like reference-numerals will be used to designate like parts throughout the several views, in which—

Figure 1 is a side elevation of a pivoted car-truck, showing my improved device in position with a part of one of the oil reservoirs or tanks in section. Fig. 2 is a top plan view of a portion of the truck, showing the device in position. Fig. 3 is a top plan view of the rigid truck, showing the connections with the oil-cups for bringing the latter into engagement with the flanges of the wheels.

In Figs. 1 and 2 the form of truck shown is known as the "pivoted" truck, which operates on a king-bolt connected with the body of the car. In this construction the oil tanks or reservoirs 1 are suitably connected to the body 2 of the car, the tank or reservoir being placed upon each wheel. Each tank or reservoir is provided with a suitable opening 3, through which the oil is introduced into the tank or reservoir. These tanks or reservoirs are provided in opposite sides near the bottom with outlet-ports 4, said ports being formed in the side walls of the tank and through the nipple or bushing 5, to which the pipe 6 is attached. These pipes 6 are curved and extend downwardly toward the car-wheels 17 and carry on their ends a rubber cup 8 8' 8'' 8''', in which is placed the filling of waste 9 or like substance. These cups are made so as to fit over the ends of the pipe 6, and they hang in position a short distance above the flanges of the wheel 7. With trucks of the pivotal type it will be observed when the truck is rounding a curve that the car moving in one direction the wheel 7 may be brought into engagement with the waste projecting from the cups 8 and 8'' and the oil fed to the flanges of the wheel, while when the car is passing around a curve in the opposite direction the flanges of the wheels may be brought into engagement with the waste carried by the cups 8'' and 8''' and the oil fed thereto in a like manner. These cups are preferably made of rubber or like material, so that they may be easily removed when desired. The packing of waste or like material in the cup serves to normally close the outlet for the oil, and when the waste comes in engagement with the flanges of the wheel the oil will be readily fed to said flanges in a manner well known in the art.

In Fig. 3 of the drawings the reservoirs 1 are of the same construction as employed in connection with the pivotal type of truck; but the curved pipes 6' are preferably made of flexible hose. The oil-cups 8, attached thereto, may be of the same form as those heretofore described. In using a device of this form of rigid truck I connect a cord, chain, or like device 10 to the flexible hose 6' and connect this cord or chain with a small lever 11, suitably placed where the motorman may operate the same with his foot to actuate the cord or chain 10 and move the waste carried by the oil-cups into engagement with the flanges of the wheels as the latter are rounding a curve. These cords or chains are so connected to the flexible hose that the waste in two of the cups will be brought into engagement with the wheels on each side of the truck when the latter is rounding a curve in one direction and that the other two cups will be brought into position when the waste is to be engaged by the wheels when the car is passing in the opposite direction. The pressure of the wheel-flange against the waste causes the ready feed of the oil onto the flange, and as soon as this pressure is released the waste in the cup is again saturated with oil in the reservoir or tank.

Having fully described my invention, what I claim as new, and desire to secure by Letters Patent, is—

1. In an oiler, an arm in fixed relation to its support, an oiling-mop carried by the arm, the mop being in such relation to the wheel as to engage the wheel when the arm-support moves with relation to the wheel, as in rounding a curve.

2. In a device of the type set forth, the combination with an oil-reservoir secured to the body of the car, of pipes extending from opposite sides of said reservoir and in fixed relation thereto, with means carried by the pipes for feeding oil to the wheel when the pipe-support moves with relation to the wheel, said means extending to opposite points on the side of the wheels.

3. A device of the type set forth, consisting of an oil-reservoir secured to the body of the car, and carrying at opposite ends thereof means for feeding the oil, the means being in fixed relation with the reservoir and extending to opposite points on the side of the wheels, said feeding means being adapted to contact with the side of the wheel on which they extend when the means move with relation to the wheel.

In testimony whereof I have hereunto signed my name in the presence of two subscribing witnesses.

GEORGE JAMES PEACOCK.

In presence of—
LOUIS MOESER,
M. HUNTER.